June 4, 1963 L. BLAGG 3,092,182
BOREHOLE APPARATUS
Filed June 19, 1959 5 Sheets-Sheet 1

Leon Blagg
INVENTOR.

BY Robert Horsfield
ATTORNEY

Leon Blagg
INVENTOR.

BY Robert Hockfield
ATTORNEY

June 4, 1963

L. BLAGG

3,092,182

BOREHOLE APPARATUS

Filed June 19, 1959

Leon Blagg
INVENTOR.

BY Robert Hockfield
ATTORNEY

United States Patent Office 3,092,182
Patented June 4, 1963

3,092,182
BOREHOLE APPARATUS
Leon Blagg, Channelview, Tex., assignor to Schlumberger Well Surveying Corporation, Houston, Tex., a corporation of Texas
Filed June 19, 1959, Ser. No. 821,490
19 Claims. (Cl. 166—241)

This invention relates to borehole apparatus and, more particularly, pertains to new and improved apparatus especially useful for maintaining an instrument in a selected position relative to the borehole axis or sidewall during a traverse of the borehole.

Various mechanisms are available either for centering or for eccentering an instrument in a borehole or for maintaining a wall-engaging instrument in contact with the sidewall of the borehole as the instrument is passed through. One such mechanism, comprised of an array of bowed springs, has been used heretofore with considerable success. For example, several springs distributed equally about an instrument can be used to center it in a borehole. However, bowed spring arrangements are limited in their working range of borehole diameters. This is understandable because for a spring of given length, lateral biasing force decreases as a function of borehole diameter. Thus, the bowed springs may have to be of prohibitive length in order to accommodate large changes in diameter. In addition, for a wide range of borehole diameters, it is ordinarily necessary to utilize springs whose restoring forces are relatively weak. Consequently, in a borehole section of appreciable inclination, a spring on the low side of the instrument is almost entirely collapsed by the weight of the instrument, and centering action is impaired. Further, a long bowed spring may bend in several different modes so that centering action may not always be consistent.

It is, therefore, an object of the present invention to provide new and improved apparatus for positioning an instrument in a borehole and useful in a relatively wide range of borehole diameters.

Yet another object of the present invention is to provide new and improved apparatus for positioning an instrument in a borehole and of comparatively small longitudinal dimensions.

A further object of the present invention is to provide new and improved apparatus for positioning an instrument in a borehole and featuring a selected force versus lateral deflection characteristic.

A still further object of the present invention is to provide new and improved apparatus for positioning an instrument in a borehole and affording a relatively constant force versus lateral deflection characteristic over a given range of borehole diameters.

Another object of the present invention is to provide new and improved apparatus for positioning an instrument in a borehole in a consistent and highly effective manner.

Borehole apparatus in accordance with the present invention is comprised of a support assembly adapted to be passed through a borehole. The support assembly includes a support member having a guide section extending longitudinally relative to the borehole and a pair of mountings carried by the support member. One of the mountings is operatively associated with the guide section for movement relative to the other mounting. The apparatus further comprises a pair of arms which include adjacent portions pivotally connected to one another and opposed portions pivotally connected to respective ones of the mountings. The axes of at least two of the pivotal connections are non-parallel to one another and one of the arms includes a resilient portion. Thus, the arm containing the resilient portion is adapted to flex upon the application thereto of a bending moment so as to bias the adjacent portions of the arms away from the support assembly and toward the sidewall of the borehole.

The novel features of the present invention are set forth with particularity in the appended claims. The present invention, both as to its organization and manner of operation together with further objects and advantages thereof, may best be understood by reference to the following description taken in connection with the accompanying drawings in which:

Figure 1:
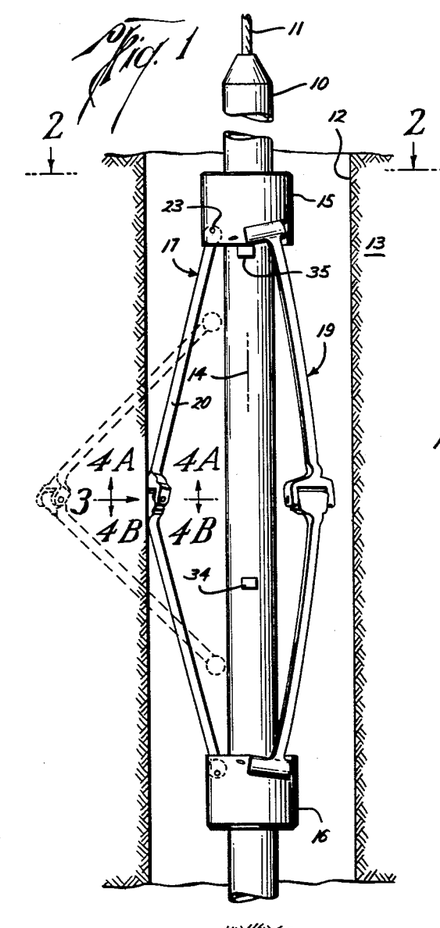
FIG. 1 is a view in side elevation of apparatus constructed in accordance with the present invention shown in operative condition within a borehole drilled into the earth.

In FIG. 1 of the drawings, apparatus embodying the present invention is shown to be comprised of a housing or mandrel 10 suspended by a cable 11 in a borehole 12 which is drilled into earth formations 13. The borehole 12 may or may not be filled with the usual drilling mud and by means of a winch (not shown) upon which the cable 11 is spooled, the housing 10 is lowered and raised through the borehole 12 in a customary manner. The housing 10 may be of conventional pressure-resistant construction arranged to contain any of various types of apparatus for exploring the borehole or the earth formations. Apparatus for these purposes is conventional and forms no part of the present invention; consequently, a detailed description is deemed unnecessary. For the purposes of the present discussion, it is sufficient to assume that housing 10 is to be maintained in a given position, for example, with its longitudinal axis 14 in alignment with the longitudinal axis of borehole 12 as the instrument is passed through the borehole, and apparatus embodying the present invention is ideally suited to this task.

Slidably supported on mandrel 10 are upper and lower collars 15 and 16. The interior dimensions of the collars 15 and 16 are arranged in a known manner so that mandrel 10 acts as a guide constraining movement of the collars relative to one another along longitudinal axis 14. The portion of the apparatus thus far described constitutes a support assembly of which mandrel 10 may be termed a support member whose outer surface forms a guide section on which mountings 15 and 16 are carried. The mountings 15 and 16 are, of course, operatively associated with the guide section so that one is movable relative to the other.

Figure 2:
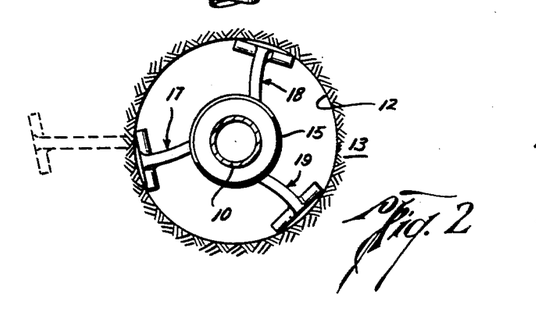
FIG. 2 is a cross-sectional view taken along line 2—2 of FIG. 1.

Extending between the collars or mountings 15 and 16 are three arm assemblies 17, 18, and 19. As shown in FIG. 2, these assemblies are spaced equally about housing 10 and portions thereof extend away from the axis 14 toward the sidewall of the borehole 12. They are of identical construction and thus only a single arm assembly, namely the one numbered 17, will be described in detail.

Figure 3:
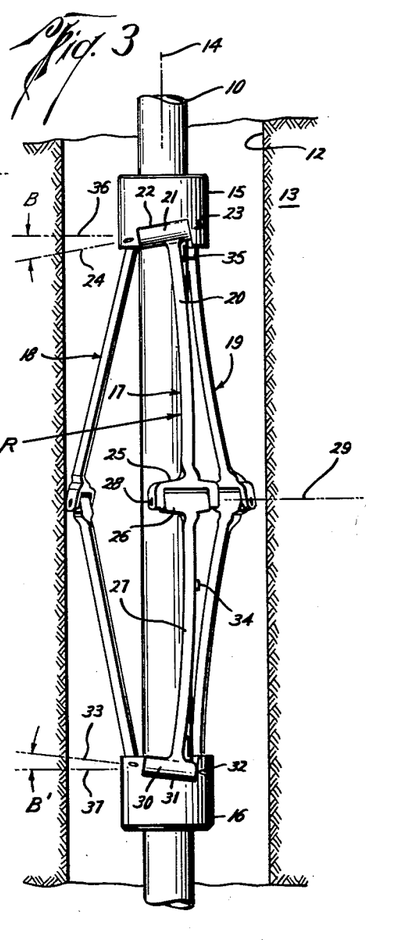
FIG. 3 is a view similar to the one illustrated in FIG. 1, but taken in the direction of arrow 3.

As best seen in FIG. 3, arm assembly 17 includes an upper arm 20 having its upper end 21 fitted into an appropriate recess 22 in collar 15. End 21 is suitably shaped and is provided with an opening (not shown) that is aligned with complementary openings in the collar 15 all of which receive a pivot pin 23. Thus, arm 20 is connected at its end portion 21 to collar 15 by a pivotal connection which constrains the arm for substantially only pivotal movement, relative to the collar, about an axis 24.

At its lower end arm 20 is provided with a yoke-shaped portion 25 which receives an appropriately shaped upper end portion 26 of a lower arm 27. Complementary openings through the yoke 25 and end portion 26 of arm 27 receive a pivot pin 28. The connection thus formed between the arms constrains them for substantially only pivotal movement relative to one another about an axis 29.

The lower end 30 of arm 27 is received within a recess 31 in lower collar 16 and complementary openings through the collar and end portion 30 receive a pivot pin 32. This connection constrains the arm 27 for pivotal movement relative to lower collar 16 about a given axis 33.

Assuming for the moment that the arm assemblies 17, 18 and 19 are biased outwardly relative to support member 10 and engage the sidewall of borehole 12, it will be apparent that as the apparatus is lowered into the borehole, the collars 15 and 16 will slide upwardly along the support 10 and to limit such movement, a stop or abutment 34 is secured to the housing for engagement by the upper surface of lower collar 16. Likewise, when the apparatus is moved upwardly another stop or abutment 35 engages the lower surface of upper collar 15. Accordingly, movement through the borehole in both directions is facilitated.

Figure 4A:
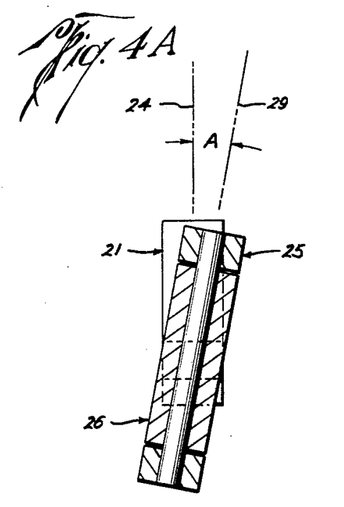
FIGS. 4A and 4B are cross-sectional views taken along lines 4A—4A and 4B—4B, respectively, of FIG. 1.
Figure 4B:
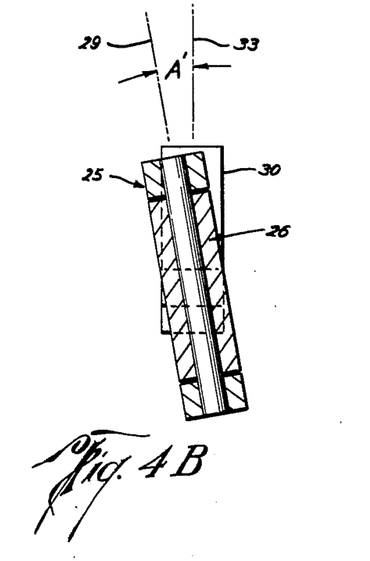

It has been discovered that the arm assemblies may be biased outwardly in a relatively simple and efficient manner by constructing the arms of a resilient material such as steel permitting the arms to bend while maintaining essentially fixed lengths and orienting the axes 24, 29 and 33 so that at least two are not parallel to one another. In particular, as seen in FIG. 4A, the orthogonal projections of axes 24 and 29 in a plane perpendicular to arm 20 (when arm 20 is unstressed) define a given angle A while the corresponding orthogonal projections of axes 29 and 33 in a plane perpendicular to arm 27 (when arm 27 is unstressed) define a similar angle A' (FIG. 4B). Thus, axes 24 and 29 are nonparallel and axes 29 and 33 are nonparallel. As seen in FIG. 3, the axis 24 makes an angle B with a plane 36 perpendicular to longitudinal axis 14 and axis 33 defines a similar angle B' with another plane 37 perpendicular to longitudinal axis 14. The angles B and B' will be discussed more fully hereinafter.

Figure 5:
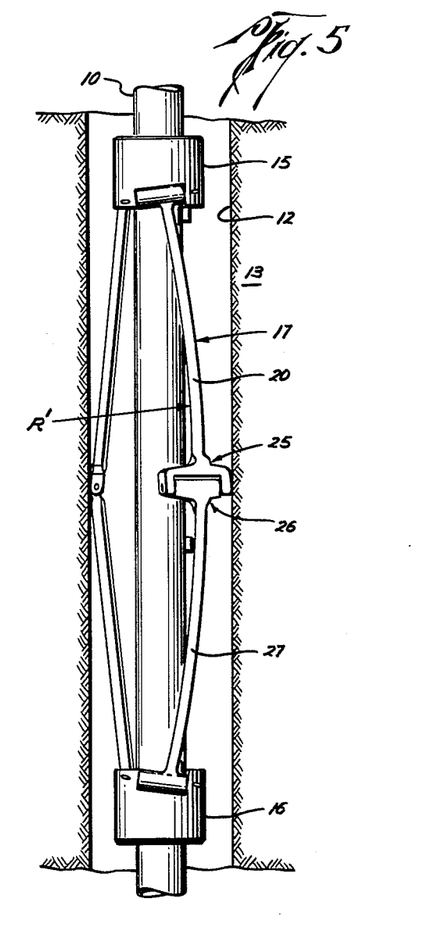
FIG. 5 is similar to FIG. 3, but illustrates the apparatus in different condition of operation.

In operation, as the apparatus moves through borehole 12 and the borehole diameter decreases, arm assemblies 17—19 are driven inwardly. Of course, collars 15 and 16 are displaced away from one another to accommodate such movement. Considering exemplary arm assembly 17, because of the nonparallel relationship of axes 24 and 29 and axes 29 and 33, the arms 20 and 27 flex or bend sideways as assembly 17 moves inwardly toward support 10. In the condition shown in FIGS. 1–3, arms 20 and 27 form a bow of radius R; while in an extreme condition with the arms substantially completely collapsed inwardly, a condition as shown in FIG. 5 obtains with the bow of much smaller radius R'. The resiliency of the arms 20 and 27, of course, tend to restore the assembly 17 to an unstressed condition (represented in broken outline in FIGS. 1 and 2) and thus the arms 20 and 27 are biased outwardly relative to support 10. It is thus apparent that as the apparatus embodying the present invention is passed through borehole, the arm assemblies 17, 18 and 19 compress inwardly as the borehole diameter decreases but because of the action just described, a resilient restoring force tends to expand the arm assemblies and maintain them in contact with the sidewall despite changes in borehole diameter.

Obviously, it is important for the several pivotal connections to be sufficiently strong to withstand operating stresses and thus the collars 15 and 16 may be constructed of a steel of appropriate quality. This is also true of the complementary end portions of the arms 20 and 27 and of the various pivot pins.

Because of the differences in the structures of complementary arm portions 25 and 26, the arms 20 and 27 may not bend similarly. If similar bending movement is desired, the relative lengths of the arms can be appropriately chosen. Further, the arms can be offset relative to their end portions 21 and 31, as shown, so that as the arms 20 and 27 bend, portions 25 and 26 move from one side to the other of a vertical plane defined by the axis of support 10 and portions 21 and 31.

Figure 6:
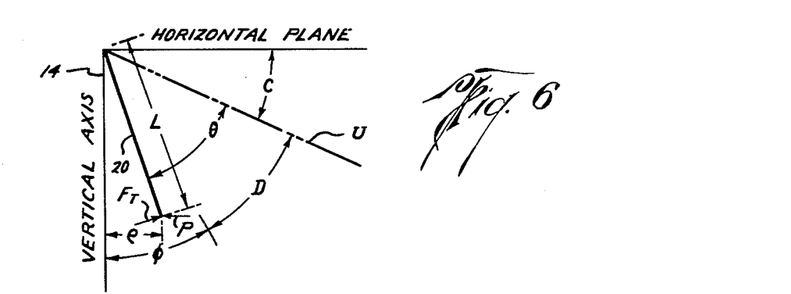
FIG. 6 is a greatly simplified representation of a portion of the apparatus illustrated in FIGS. 1–5.

To analyze the operation of apparatus embodying the present invention, reference is made to FIG. 6 which is a greatly simplified representation of upper arm 20, illustrating it as being movable between a horizontal plane and vertical axis 14. Since the arms 20 and 27 are identical, an analysis of the static conditions on a single arm will be sufficient for the purposes of the following discussion. In FIG. 6, broken line U represents the unstressed position of arm 20, displaced by an angle C from the horizontal plane. As will be evident from the discussion to follow, position U may be selected to provide a desired range of operation for arm 20.

It may be shown that the tangential restoring force $F_t$ may be expressed as follows:

$$F_t = \frac{EI \sin^2 A \cos \theta \sin \theta}{L^2 \sqrt{1 - \sin^2 A \sin^2 \theta}} \quad (1)$$

where E is the modulus of elasticity of the arm material, I is the moment of inertia of the arm, L is the length of the arm, and $\theta$ is the angular displacement of the arm from the unstressed position U, A being the angle defined in FIG. 4A. To simplify the problem, it is assumed that the modulus of elasticity of steel is $3 \times 10^7$ pounds per square inch, that the arm has cross-sectional dimensions of ¾ inch by ⅜ inch providing a moment of inertia of .00275 in.$^4$, that the angle A is 10°, and that the arm is 10 inches in length. Accordingly, Formula 1 above may be simplified as follows:

$$F_t = \frac{24.8 \sin \theta \cos \theta}{\sqrt{1 - .0301 \sin^2 \theta}} \quad (2)$$

From FIG. 6 it may be seen that the radial or lateral restoring force P is:

$$P = F_t \sin \theta \quad (3)$$

and substituting the expression for $F_t$ from Equation 2 into Equation 3 it will be seen that $$P = \frac{24.8 \sin^2 \theta \cos \theta}{\sqrt{1 - .0301 \sin^2 \theta}} \quad (4)$$

Figure 7:
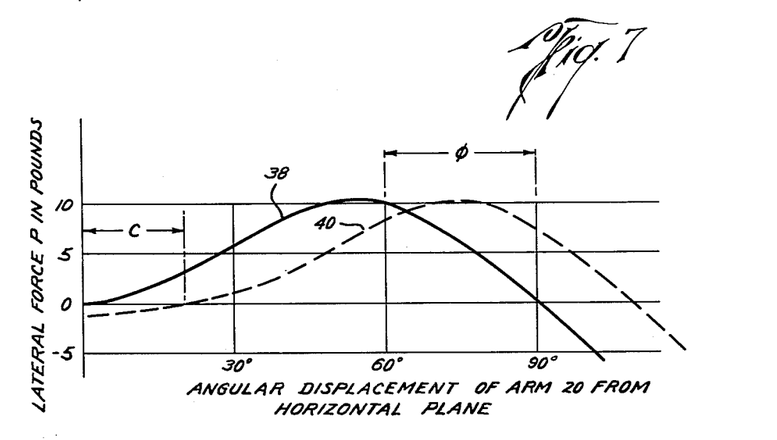
FIGS. 7 and 8 are graphs which are useful in explaining the operation of apparatus embodying the present invention.

In FIG. 7, the relationship expressed in Equation 4 is represented graphically by curve 38 which demonstrates that the lateral force in pounds increases as the angular displacement increases. It reaches a maximum value in the neighborhood of 50 to 60 degrees and then decreases toward zero as the displacement approaches 90 degrees.

It is also evident that the lateral force becomes negative beyond 90 degrees.

Figure 8:
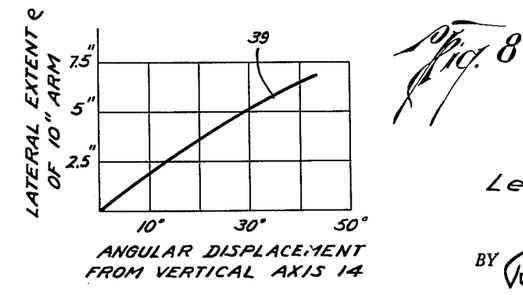

If, for example, it is desired to obtain a relatively constant force over a desired range of angular displacement, a selected portion of the characteristic represented by curve 38 may be used. For example, let it be assumed that a range of borehole diameters from 6 inches to 16 inches is to be accommodated. In FIG. 8, curve 39 represents the lateral extent of a 10-inch arm as a function of angular displacement from vertical axis 14. For a lateral change of five inches (which is the maximum change required for the selected range of diameters), a 30 degree change in arm displacement is required. Referring again to FIG. 7, it will be observed that the portion of curve 39 of most desirable shape occurs over a 30 degree change in $\theta$ from 40 degrees to 70 degrees.

If arm 20 is in its unstressed condition when aligned with the horizontal plane (FIG. 6), angle B (FIG. 3) is equal to angle A of FIG. 4A. In order to operate the arm in the desired range from 40 degrees to 70 degrees, it is necessary to displace the unstressed condition by an angle C, represented in FIG. 7 as 20 degrees. Angle B of FIG. 3 (as well as angle B') may be calculated from the following relationship:

$$\text{Tan } B = \frac{\cos C}{\sqrt{\cot^2 A + \sin^2 C}} \quad (5)$$

If angle A is assumed to be 10 degrees to provide a reasonable limit to the stresses developed in the arm, from Equation 5, angle B may be found to have a value of 8 degrees, 40 minutes. With these values, the lateral force developed by arm 20 as a function of angular displacement $\theta$ exhibits a characteristic represented by broken line 40 in FIG. 7 and the useful range of displacement occurs from 60 to 90 degrees. It will be noted that the lateral force developed through this range varies between 7½ and 10 pounds. Obviously, a relatively constant wall-engaging force is featured over the desired range of borehole diameters.

It is therefore evident that apparatus embodying the present invention may be employed to center an instrument within a borehole while operating efficiently and effectively over a relatively large range of borehole diameters. In addition, it is evident from the example given, in which arms 10 inches in length are employed, that the apparatus embodying the invention is relatively small in its longitudinal dimensions. Further, apparatus embodying the invention can be arranged to provide a selected force versus lateral deflection characteristics. It may be arranged to be relatively constant or it may be designed to provide a variety of different characteristics. For example, by appropriate selection of the angles A and B it is possible to obtain an action which produces an outward biasing force over one range while upon reaching another range an inward biasing force is effected (note the negative region of curve 38 in FIG. 7). It is further evident that apparatus embodying the present invention is relatively simple to construct while operating consistently to provide accurate centering of a borehole instrument despite the changes in the borehole diameter.

It is also evident that angles A and A' while of equal value are of opposite sign (FIGS. 4A and 4B). Accordingly, although the arms 20 and 27 deflect sideways as the apparatus operates, relative torque between the collars 15 and 16 is essentially zero. Further, within the limits of the strength of the materials, by increasing angle A the lateral force may be increased to any desired value.

Figure 9:
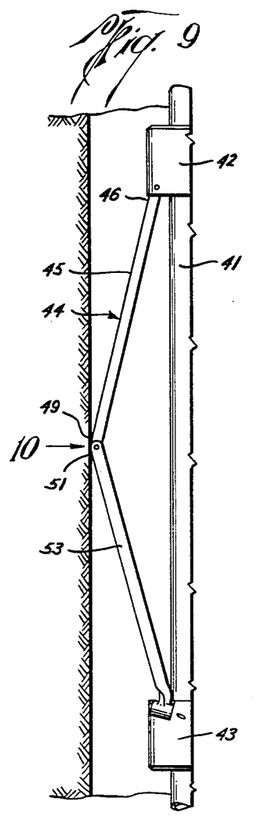
FIG. 9 is a view similar to the representation in FIG. 1, but it illustrates another embodiment of the invention.
Figure 10:
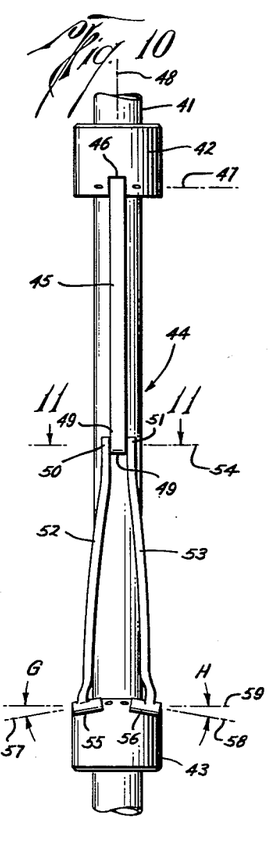
FIG. 10 is a view of the apparatus of FIG. 9 taken in the direction of arrow 10.
Figure 11:
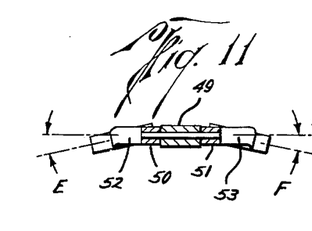
FIG. 11 is a cross-sectional view taken along line 11—11 of FIG. 10.

In the embodiment of the invention illustrated in FIG. 9, a support for mandrel 41 carries upper and lower slidable collars 42 and 43 and an arm assembly 44 extends between the collars. The assembly 44 is comprised of an upper arm 45 pivotally connected at its upper end 46 to collar 42 so that movement relative to the collar is constrained about a pivotal axis 47 (FIG. 10) whose orthogonal projection in a plane containing longitudinal axis 48 of mandrel 41 is perpendicular to the longitudinal axis 48. At its lower end 49, arm 45 is pivotally connected to upper end portions 50 and 51 of lower arms 52 and 53. These pivotal connections have a common pivotal axis 54 whose orthogonal projection in a plane containing axis 48 is perpendicular to axis 48. The lower ends 55 and 56 of arms 52 and 53 are pivotally connected to lower collar 43 for movement about axes 57 and 58, respectively. Assuming that the arms 52 and 53 are in their unstressed conditions, the orthogonal projections of the axes 57 and 58 and the orthogonal projection of pivotal connection 54 in a plane perpendicular to the arms 52 and 53 define equal but opposite angles E and F as represented in FIG. 11. Further, as seen in FIG. 10, the axes 57 and 58 define with respect to a horizontal plane 59 angles G and H of equal and opposite values. It is evident that by constructing arms 52 and 53 of a resilient material such as steel and by utilizing pivotal connections of appropriate strength the action of arm assembly 44 is essentially like the action of arm assembly 17 of the embodiment of FIGS. 1–5. Since angles E and F are of opposite sign, the arms 52 and 53 bow away from one another as the arm assembly 44 is deflected inwardly and the resilient restoring force in the arms tends to bias the arm assembly outwardly, thus causing its outer extremity to follow the wall of a borehole. Further, by suitably selecting angles E and F a desired amount of force, within the elastic limit, can be obtained. Moreover, an appropriate selection of angles G and H will provide an unstressed condition for the arm assembly at a selected position. Accordingly, a substantially constant lateral force may be obtained over a desired range of borehole diameters in essentially the same manner explained in connection with FIGS. 6–8.

Figure 12:
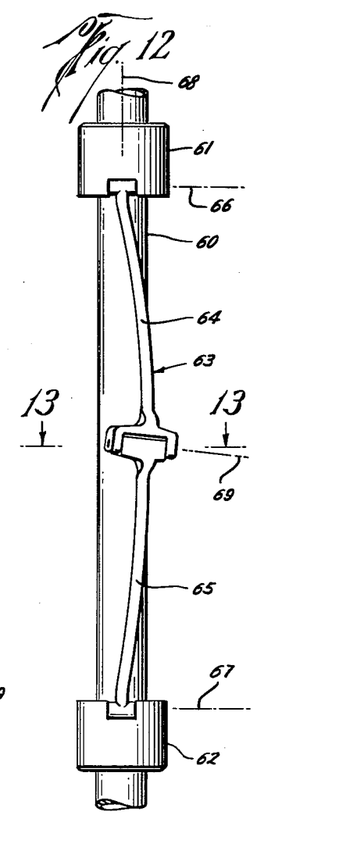
FIG. 12 is a view similar to FIG. 4, but illustrating still another embodiment of the invention.

Referring now to the embodiment of the invention illustrated in FIG. 12, mandrel 60 slidably carries a pair of collars 61 and 62 to which an arm assembly 63 is connected at its upper and lower ends. The arm assembly 63 is comprised of an upper arm 64 and the lower arm 65 whose upper and lower ends, respectievly, are pivotally connected to the collars 61 and 62 for movement about axes 66 and 67. The orthogonal projections of the axes 66 and 67 in a plane containing longitudinal axis 68 are perpendicular to the axis 68. Adjacent end portions of the arms 64 and 65 are connected together for pivotal movement about an axis 69. In the unstressed condition of the arms 64 and 65, the orthogonal projection of the axis 69 in a plane perpendicular to either of the arms 64 and 65 is inclined relative to the orthogonal projection of the corresponding one of the axes 66 or 67 in the corresponding plane. With this non-parallel axis arrangement, it is obvious that the same type of action described in connection with the embodiment of FIGS. 1–5 is achieved. However, it is evident that a relative torque will be developed between collars 61 and 62 so that in order to retain a desired lateral biasing force, it may be desirable to provide keyed connections between the collars 61 and 62 and the mandrel 60, for example, in a manner to be described later in connection with FIG. 14. Thus, the collars are constrained against rotational movement relative to the mandrel 60 while sliding longitudinal movement is permitted.

Figure 13:
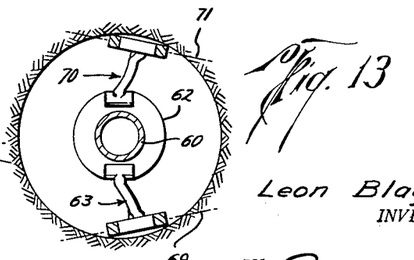
FIG. 13 is a cross-sectional view taken along line 13—13 of FIG. 12.

Relative torque between the collars 61 and 62 may be avoided by the use of another arm assembly 70, illustrated in FIG. 13, positioned on a side of the mandrel 60 opposite to arm assembly 63. In arm assembly 70, a pivotal connection between the upper and lower arms has a pivotal axis 71 which has essentially the same inclination as axis 69 but is of opposite direction. Accordingly, relative torque developed by the arm assemblies 63 and 70 is fully counterbalanced.

Figures 14, 15, 16, 17:
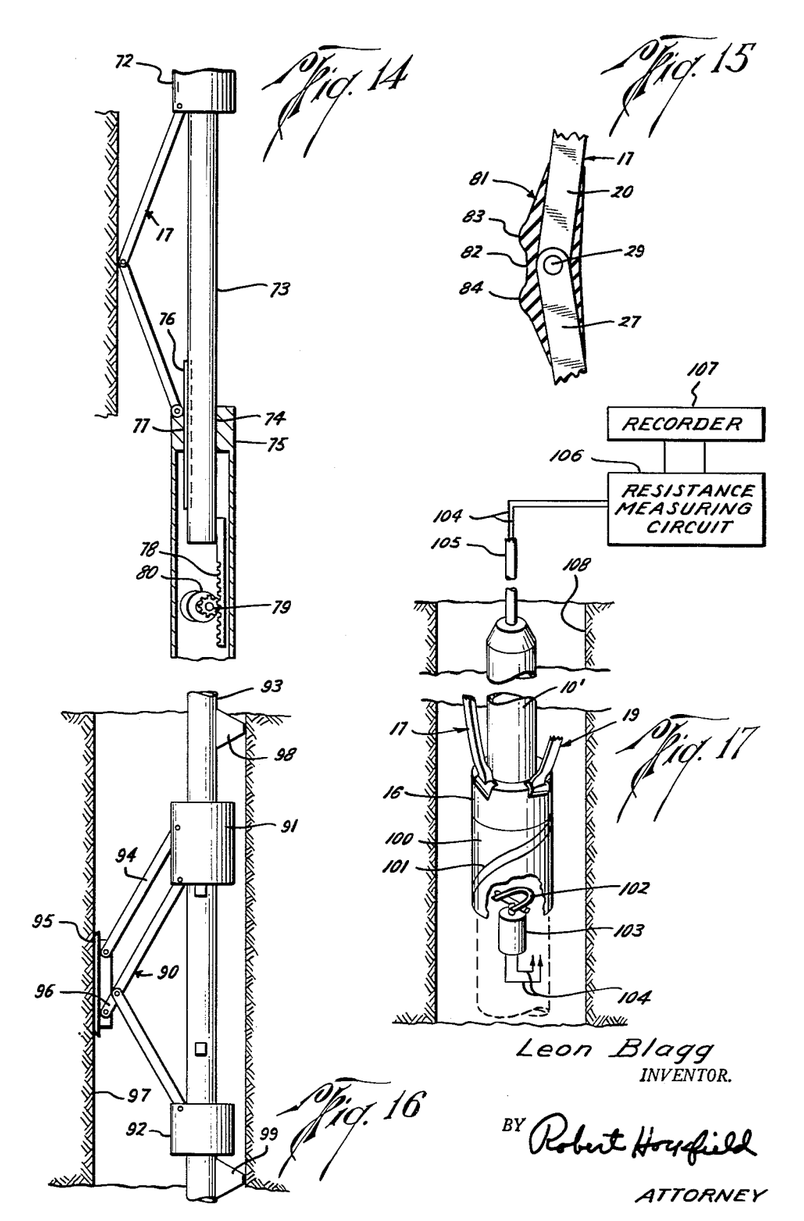
FIGS. 14–17 represent various modifications which may be made to apparatus embodying the present invention.

Although slidable collars on a mandrel have been illustrated in connection with the embodiments of the invention described hereinbefore, obviously other mounting arrangements are entirely suitable in the application of the present invention. For example, as shown in FIG. 14, an upper mounting 72 may be provided with a downwardly-extending, integral shaft 73 that is slidably received within a closely-fitting opening or bore 74 in a lower mounting 75. A key 76 on shaft 73 cooperates with a keyway 77 cut into the wall of bore 74 to prevent relative rotation between the mountings 72, 75 while permitting relative longitudinal movement. One or more arm assemblies such as the one designated 17 (corresponding to the similarly-identified arm in the embodiment of FIGS. 1–5) may be connected between the mountings 72 and 75 to provide the unique action described in connection with the present invention.

If desired, appropriate means may be included for displacing the mountings 72 and 75 away from one another thereby to retract the arm assembly 17 and facilitate its passage through a borehole. Any of various forms of mechanical or hydraulic mechanisms of well-known construction may be employed. For example, the lower end of shaft 73 may be provided with an appropriate rack 78 and a pinion 79 supported for meshing engagement with the rack 78 is arranged to be driven by an electric motor 80. Appropriate electrical connections (not shown) extend to the surface of the earth where a source of electrical energy (not shown) may be connected to energize the motor. Thus, at the option of an operator, the motor 80 may be energized to drive the rack 78 upwardly and an appropriate locking mechanism (not shown) may be provided so that the motor may be de-energized while the mountings 72 and 75 remain in a selected longitudinally spaced condition.

Any of various forms of wall-engaging members may be associated with the embodiments of the invention described herein. For example, either or both of the arms may be appropriately shaped so as to provide a pad-like extension positioned to engage the sidewall of the borehole and thus avoid or minimize fouling of the pivotal connection between the upper and lower arms by wall material. Alternatively, the pivotal connection may be encased in a suitable fluid-tight housing such as illustrated in FIG. 15. Thus, the pivotal connection between the upper and lower arms of arm assembly 17 is encased in a molded rubber housing 81 which has a portion 82 of reduced cross-sectional area in a plane transverse to the pivotal axis 29. In this way, pivotal movement between the arms 20 and 27 is unimpeded. Portions 83 and 84 of the housing 81 which are above and below the reduced section 82 extend outwardly toward the wall of the borehole and thus provide appropriate wall-contact portions which are displaced longitudinally from the axis 29. It is thus evident that the pivotal connection between the arms 20 and 27 is protected, appropriate wall-engaging portions are provided and, at the same time, pivotal movement between the arms is not impaired.

Apparatus embodying the present invention may also be used for maintaining a wall-engaging instrument in a desired position with respect to the sidewall of the borehole as it is passed through the borehole. For example, as shown in FIG. 16, an arm assembly 90 which may be similar to arm assembly 44 in the embodiment of FIGS. 9–11 is pivotally connected at its upper and lower ends to collars 91 and 92 which are slidably supported on a mandrel 93. Another arm 94 positioned above the upper arm of the arm assembly 90 is pivotally connected to the collar 91 at one end and is pivotally connected at its outer end to the rear of a wall-engaging device 95. An extension 96 of the upper arm of arm assembly 90 is also pivotally connected to the rear of the wall-engaging device 95. The upper arm of assembly 90 and arm 94 have their pivotal connections arranged to form a parallel-arm linkage of a type such as described in Patent No. 2,876,413. Thus, the wall-engaging device 95 is maintained in a predetermined relationship relative to mandrel 93 as it is urged into biased engagement with the sidewall of a borehole 97 by the action of arm assembly 90.

If desired, a similar arrangement may be provided on the side of mandrel 93 opposite to arm assembly 90 so that two wall-engaging members may be maintained in contact with opposite sidewall portions of the borehole 97. On the other hand, the mandrel 93 may itself be maintained against the sidewall of the borehole and appropriate wall-contact members or bumpers 98 and 99 may be provided for this purpose. Wall-engaging device 95 may carry any of a variety of sensing elements in the form of either electrodes or other means for investigating the characteristic of the earth formation penetrated by the borehole 97.

It is evident from the illustration of FIG. 16, that apparatus embodying the present invention may be utilized to maintain a device such as the pad 95 in engagement with the sidewall of the borehole or for maintaining an instrument contained within mandrel 93 in an eccentered position relative to the axis of the borehole.

Obviously, since the lateral position of an arm assembly featuring the present invention is dependent upon the diameter of a borehole through which it is passed, that parameter may be measured. Thus, either the position of an arm relative to the mandrel or the relative spacing between the mountings or collars may be sensed by any of various conventional devices to provide indications of borehole diameter. For example, an arrangement such as disclosed and claimed in Patent No. 2,712,697 is illustrated in FIG. 17. A lower collar 16 is slidable on a modified housing 10' constructed of a nonmagnetic material. Collar 16 is connected to another collar 100 constructed of a ferromagnetic material and provided with helicoidal slot 101. Rotatably supported within the housing is a horse shoe shaped magnet 102 mechanically connected to a variable resistor 103. Leads 104 extend from variable resistor 103 through an electric cable 105 to a resistance-measuring circuit 106 at the surface of the earth. Circuit 106 is connected to an appropriate recorder 107 in which the recording medium is displaced in a conventional manner in proportion to movement of the housing 10' through a borehole 108.

As the instrument passes through the borehole, variations in the borehole diameter produce movement of the collar 16 and thus magnetic element 100 is positioned longitudinally relative to housing 10' as a function of borehole diameter. Because of the presence of helicoidal slot 101, magnet 102 likewise is positioned in rotation as a function of borehole diameter and resistance element 103 exhibits a corresponding resistance value. Resistance-measuring circuit 106 develops a voltage dependent upon the resistance value of element 103 and thus recorder 107 provides a record of borehole diameter as a function of depth.

As described earlier in connection with the embodiment of FIGS. 1–5, an arm assembly constructed in accordance with the present invention is consistently maintained in engagement with the sidewall of the borehole. Accordingly, the arm assemblies in the embodiment of FIG. 17 efficiently and effectively respond to changes in borehole diameter and accurate indications are provided.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; and a pair of arms including adjacent portions pivotally connected to one another and opposed portions pivotally connected to respective ones of said mountings, the axes of at least two of the pivotal connections being nonparallel to one another, and one of said arms being formed of a bar of resilient material.

2. Apparatus for maintaining borehole equipment at a given position relative to the central axis of a borehole comprising: a support member adapted for use in a borehole and having a guide section extending longitudinally relative to the borehole; a pair of collars carried by said support member, said collars being slidably associated with said guide section for limited movement relative to each other; and three pairs of arms, each of said pairs including adjacent portions pivotally connected to one another and opposed portions pivotally connected to and equally spaced about respective ones of said collars, the axes of at least two of the pivotal connections being nonparallel to one another, and one arm of each of said pairs being formed of a bar of resilient material permitting said one arm to flex upon the application thereto of a bending moment so as to bias said adjacent portions of said arms away from said support member and toward the sidewall of the borehole.

3. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; and a pair of arms including adjacent portions pivotally connected to one another and opposed portions pivotally connected to respective ones of said mountings, the axes of at least two of the pivotal connections being nonparallel to one another, one of said arms being formed of a bar of resilient material, and one of said adjacent portions of said arms having a wall-engaging member movable therewith.

4. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; and at least one pair of arms of substantially fixed length including adjacent portions pivotally connected to one another and opposed portions pivotally connected to respective ones of said mountings, the axes of at least two of the pivotal connections being nonparallel to one another, and one of said arms being constructed of a resilient material and thereby adapted to flex upon the application of a bending moment.

5. Apparatus for maintaining borehole equipment at a given position relative to the central axis of a borehole comprising: a support member adapted for use in a borehole and having a guide section extending along a longitudinal axis oriented in substantially the same direction as the vertical axis of the borehole; a pair of mountings carried by said support member, one of said mountings being operatively associated with said guide section for movement relative to the other of said mountings; and a pair of arms including adjacent portions pivotally connected to one another and opposed portions pivotally connected to respective ones of said mountings, one of said arms being formed of a bar of resilient material and the axes of at least two of the pivotal connections being nonparallel to one another as viewed in orthogonal projections upon a plane containing said longitudinal axis.

6. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; at least one pair of arms including adjacent portions pivotally connected to one another and opposed portions pivotally connected to respective ones of said mountings, the axes of at least two of the pivotal connections being nonparallel to one another, and one of said arms being formed of a bar of resilient material; and means for obtaining indications in response to relative movement between said mountings.

7. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; and a pair of arms including adjacent portions pivotally connected to one another and opposed portions pivotally connected to respective ones of said mountings, the axes of the two last-mentioned pivotal connections being nonparallel to one another and to the first-mentioned pivotal connection, and one of said arms being formed of a bar of resilient material.

8. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; and a pair of arms including adjacent portions pivotally connected to one another and opposed portions pivotally connected to respective ones of said mountings, the axis of the first-mentioned pivotal connection and the axis of one of the last-mentioned pivotal connections being nonparallel to one another as viewed in orthogonal projections on a plane substantially perpendicular to a corresponding arm, and one of said arms being formed of a bar of resilient material.

9. Apparatus for maintaining borehole equipment at a given position relative to the central axis of a borehole comprising: a support member adapted for use in a borehole and having a guide section extending along a longitudinal axis oriented in substantially the same direction as the vertical axis of the borehole; a pair of mountings carried by said support member, one of said mountings being operatively associated with said guide section for movement relative to the other of said mountings; and a pair of arms including adjacent portions pivotally connected to one another and opposed portions pivotally connected to respective ones of said mountings, one of said arms being formed of a bar of resilient material, the axis of the first-mentioned pivotal connection and the axis of one of the last-mentioned pivotal connections defining a given angle when said one arm is in an unstressed condition, and the axis of one of said first-mentioned and said one last-mentioned pivotal connections defining another angle with a plane perpendicular to said longitudinal axis of a value different from the value of said given angle.

10. Apparatus for maintaining borehole equipment at a given position relative to the central axis of a borehole comprising: a support member adapted for use in a borehole and having a guide section extending longitudinally relative to the borehole; a pair of mountings carried by said support member, one of said mountings being operatively associated with said guide section for movement relative to the other of said mountings; an arm pivotally connected to one of said mountings; and two coextensive arms separately and pivotally connected to the other of said mountings, adjacent portions of said coextensive arms being jointly and pivotally connected to an adjacent portion of said first-mentioned arm, the axes of the three last-mentioned pivotal connections being nonparallel to one another, and each of said coextensive arms being formed of a bar of resilient material.

11. Apparatus for maintaining borehole equipment at a given position relative to the central axis of a borehole comprising: a support member adapted for use in a borehole and having a guide section extending longitudinally relative to the borehole; a pair of mountings carried by said support member, said mountings being operatively associated with said guide section for limited movement relative to each other; a pair of arms including first end portions disposed adjacent to respective ones of said mountings, said arms extending away from said support member toward the sidewall of the borehole and including other second end portions adjacent to one another; means for connecting each of said first end portions of said arms to a respective one of said mountings and for constraining said first end portions for substantially only pivotal movement relative to said mountings about respective, given axes; means for connecting said second end portions of said arms to one another and for constraining said second end portions for substantially only pivotal movement relative to one another about another given axis, at least two of the aforesaid axes being nonparallel to one another, and one of said arms being formed of a bar of resilient material.

12. Borehole apparatus comprising: a support adapted to be passed through a borehole; a pair of mountings carried by said support for movement relative to one another along a fixed path; a first pivot arm; a second pivot arm being constructed of a resilient material permitting said second pivot arm to flex upon the application of a bending moment; a first pivotal connection between said first pivot arm and one of said mountings; a second pivotal connection between said second pivot arm and another of said mountings; and a third pivotal connection between said first and said second pivot arms, at least two of said pivotal connections having pivot axes nonparallel relative to one another.

13. Borehole apparatus comprising: a mandrel adapted to be passed through a borehole; a pair of collars mounted on said mandrel, at least one of said collars being slidable thereon for movement relative to the other collar along a fixed path; a first pivot arm; a second pivot arm constructed of a resilient material permitting said second pivot arm to flex upon the application of a bending moment; a first pivotal connection between said first pivot arm and one of said collars; a second pivotal connection between said second pivot arm and another of said collars; and a third pivotal connection between said first and said second pivot arms, at least two of said pivotal connections having pivot axes nonparallel relative to one another.

14. Borehole apparatus comprising: a mandrel adapted to be passed through a borehole; a pair of collars mounted on said mandrel, at least one of said collars being slidable thereon for movement relative to the other collar along a fixed path; first and second pivot arms each constructed of a resilient material permitting flexure upon the application of a bending moment, said pivot arms being of substantially fixed length; a first pivotal connection mechanically coupling said first pivot arm and one of said collars; a second pivotal connection mechanically coupling said second pivot arm and another of said collars; and a third pivotal connection mechanically coupling said first and said second pivot arms, at least two of said pivotal connections having pivot axes nonparallel relative to one another.

15. Borehole apparatus comprising: a mandrel adapted to be passed through a borehole; a pair of collars mounted on said mandrel, at least one of said collars being slidable thereon for movement relative to the other collar along a fixed path having a longitudinal axis relative to the borehole; first and second pivot arms each constructed of a resilient material permitting flexure upon the application of a bending moment, said pivot arms being of substantially fixed length; a first pivotal connection mechanically coupling said first pivot arm and one of said collars; a second pivotal connection mechanically coupling said second pivot arm and another of said collars; and a third pivotal connection mechanically coupling said first and said second pivot arms, said first and said third pivotal connections having pivot axes whose orthogonal projections in a plane perpendicular to a corresponding one of said arms define a given angle when said one arm is in an unstressed condition.

16. Borehole apparatus comprising: a mandrel adapted to be passed through a borehole; a pair of collars mounted on said mandrel, at least one of said collars being slidable thereon for movement relative to the other collar along a fixed path having an axis extending longitudinally relative to the borehole; a first pivot arm; a second pivot arm constructed of a resilient material permitting said second pivot arm to flex upon the application of a bending moment; a first pivotal connection mechanically coupling said first pivot arm and one of said collars; a second pivotal connection mechanically coupling said second pivot arm and another of said collars; and a third pivotal connection mechanically coupling said first and said second pivot arms, said second and said third pivotal connections having pivot axes whose orthogonal projections in a plane perpendicular to the corresponding one of said arms define a given angle when said one arm is in an unstressed condition, and the pivot axis of one of said second and said third pivotal connections defining another angle with a plane perpendicular to said longitudinal axis of a value different from the value of said given angle.

17. Borehole apparatus comprising: a support adapted to be passed through a borehole; a pair of mountings carried by said support for movement relative to one another along a fixed path; a first pivot arm; second and third coextensive pivot arms, each of said arms constructed of a resilient material permitting flexure upon the application of a bending moment; a pivotal connection between said first pivot arm and one of said mountings; a pair of adjacent pivotal connections between said second and third pivot arms and another of said mountings; and another pair of adjacent pivotal connections between said first pivot arm and said second and third pivot arms, said first-mentioned pair of pivotal connections having pivot axes nonparallel relative to one another.

18. In combination: a support; a pair of mountings carried by said support for movement relative to one another along a fixed path; a first pivot arm; a second pivot arm constructed of a resilient material permitting said second pivot arm to flex upon the application of a bending moment; a first pivotal connection between said first pivot arm and one of said mountings; a second pivotal connection between said second pivot arm and another of said mountings; and a third pivotal connection between said first and said second pivot arms, at least two of said pivotal connections having pivot axes nonparallel relative to one another.

19. In combination: a mandrel; a pair of mountings carried by said mandrel, one of said mountings being mounted for movement relative to the other along a fixed path; a first pivot arm; a second pivot arm constructed of a resilient material permitting said second pivot arm to flex upon the application of a bending moment; a first pivotal connection between said first pivot arm and one of said mountings; a second pivotal connection between said second pivot arm and another of said mountings; and a third pivotal connection between said first and said second pivot arms, said second and said third pivotal connections having pivot axes inclined relative to one another as viewed in orthogonal projections in a plane perpendicular to said second arm when said second arm is in an unstressed condition.

References Cited in the file of this patent

UNITED STATES PATENTS

| | | |
|---|---|---|
| 1,898,074 | Bailey | Feb. 21, 1933 |
| 2,248,160 | Crawford | July 8, 1941 |
| 2,311,768 | McCray | Feb. 23, 1943 |
| 2,695,820 | Segesman | Nov. 30, 1954 |
| 2,812,587 | Roussin | Nov. 12, 1957 |
| 2,886,111 | Hall | May 12, 1959 |
| 2,899,633 | Smith et al. | Aug. 11, 1959 |